(No Model.)

B. U. BUGBEE & J. RENO.
EYEGLASSES.

No. 517,430. Patented Apr. 3, 1894.

WITNESSES:
L Willis Bugbee
Elmer E. Searles

INVENTORS
Benajah U Bugbee
Joseph Reno.

THE NATIONAL LITHOGRAPHING COMPANY,
WASHINGTON, D. C.

UNITED STATES PATENT OFFICE.

BENAJAH U. BUGBEE AND JOSEPH RENO, OF SOUTHBRIDGE, MASSACHUSETTS, ASSIGNORS TO THE SOUTHBRIDGE OPTICAL COMPANY, OF SAME PLACE.

EYEGLASSES.

SPECIFICATION forming part of Letters Patent No. 517,430, dated April 3, 1894.

Application filed May 27, 1893. Serial No. 475,739. (No model.)

*To all whom it may concern:*

Be it known that we, BENAJAH U. BUGBEE and JOSEPH RENO, citizens of the United States, residing at Southbridge, in the county of Worcester and State of Massachusetts, have invented certain new and useful Improvements in Eyeglasses, of which the following is a specification.

Our invention is an improvement on that class of eye glasses and spectacles in which the eye wire or lens frame opens internally, and in which the eye wire, nose spring and nose guard are secured by a fastening screw passing through the parts. It is more especially an improvement on the invention shown and described in Letters Patent No. 437,396, granted to E. B. Fox, September 30, 1890.

Our improvement relates principally to the construction of the posts or lugs and in the manner in which the parts are secured together.

The object is to improve and simplify the construction of eye glasses of the class referred to, lessen the cost of manufacture, and secure the parts rigidly together, while admitting of the ready removal and replacing of the lens when necessary.

Our invention consists in certain details of construction and arrangement of parts as will be hereinafter fully set forth and indicated in the claims.

Figure 1:
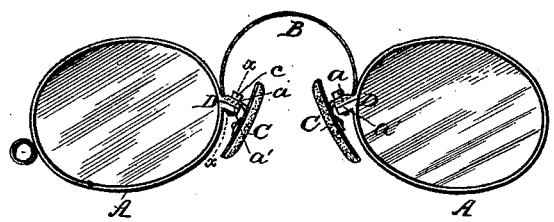
Figure 2:
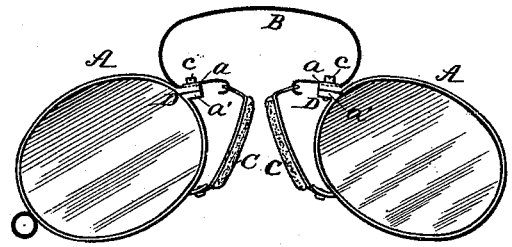
Figure 3:
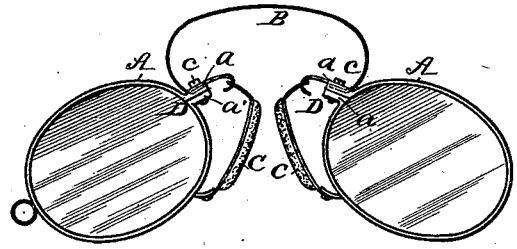
Figure 4:
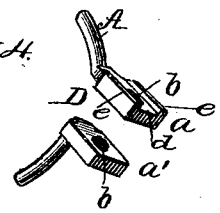
Figure 5:
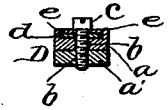
Figure 6:
Figure 7:
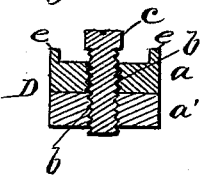

In the accompanying drawings—Figures 1, 2 and 3 are front views of eye glasses embodying our invention. Fig. 4 is a detail view on an enlarged scale of the parts of the post, and the ends of the eye wires attached thereto. Fig. 5 is a vertical sectional view on line $x$—$x$, Fig. 1. Fig. 6 is an enlarged detail view of the post with the ends of the spring and nose guard arm in position, and Fig. 7 is an enlarged sectional view of the post and screw.

In the drawings, A, A, represent the eye wires or lens frames connected by a bow spring B and provided with nose guards or clamps C C. Each eye wire or lens frame is divided internally, the separated ends being provided with the parts $a\ a'$ constituting the post D. As shown in the drawings the members of the post are arranged at a suitable angle for the attachment of the nose spring and nose guard and each of the members is provided with a screw threaded perforation $b$, for the passage of the fastening screw $c$, which secures the parts together, the perforation for the screw being approximately vertical or at right angles to the post. The upper member of the post is recessed on its upper surface as shown at $d$, Fig. 4, forming side flanges $e\ e$, the recess being constructed to receive the nose spring and also the nose guard or clamp if desired. Preferably the screw has a loose fit in the threads in the upper member of the post and a tight fit in the threads of the lower member as shown in Fig. 7. By this construction the parts are readily and tightly drawn together, and when the screw is disengaged from the lower member of the post, in opening the eye wire, it is still held in place by the threads in the upper member. When assembled the parts are held rigidly together, the spring and nose guard resting securely in the recess, and the flanges preventing any side movement of the parts. It will be seen that by this construction we avoid the use of the projecting stay pin relied upon in the patented invention heretofore referred to to hold the parts in position and which is liable to be broken off, and also that we do away with the additional perforations required in the nose spring and nose guard or clamp; thus improving and simplifying the construction of the parts.

In the patented invention the fastening screw has to be removed in order to open the eye wire, and the parts are then likely to slip out of place and become separated being only held together by the stay pin.

By the employment of the recess in the upper member of the post and by having both members of the post screw threaded, it is only necessary to loosen the screw from the lower member of the post; when the eye can be readily opened for the removal or insertion of the lens, the nose spring and nose guard being retained securely in the recess and held by the screw which is still in engagement with the upper member of the post.

Our improvement may be used with various styles of eye-glasses or spectacles, and in the drawings we have shown it applied to eyeglasses provided with nose springs and nose guards or clamps of well known construction.

In Fig. 1 the nose guard or clamp is provided with an arm bent at a suitable angle to hold the guard in proper position. In assembling the parts together the ends of the nose spring and nose guard arm are placed in the recess in the upper member of the post, and the fastening screw is then passed through the ends of the nose spring and nose guard arm and through the parts of the post securing the whole together; perforations being provided near the ends of the nose spring and nose guard arm for that purpose.

In the form of eyeglass shown in Fig. 2, the nose spring is placed in the recess in the upper member of the post and secured by the screw passing through it and the members of the post. In this style of eyeglass the end of the nose spring is extended beyond the post and made in the form of a hook, the hook being provided with a head which is received by a slot formed in the arm of the nose guard. The nose guard in this form is connected at its lower end to the lens frame in any suitable or well known manner.

In the style shown in Fig. 3 a separate piece is used for the hook, which is placed with the nose spring in the recess and secured by the fastening screw which passes through the parts.

In the eyeglasses illustrated, the nose guards are of ordinary form and are provided with a face of soft rubber, cork, or other suitable material.

The arrangement shown in Figs. 2 and 3 can of course be reversed, the hook being formed on the end of the nose guard and the slot formed in the end of the spring or separate piece.

It is obvious that our improvement may be applied to other styles of eyeglasses or spectacles and therefore we do not limit its application to the forms shown or described.

Having thus described our invention, what we claim is—

1. In eyeglasses, the eye wire divided on its inner side and provided with a post constructed of two members arranged to rest one upon the other, the upper member having its upper surface recessed, and constructed to receive the end of the spring connecting the eye wires, and each member of the post having a screw threaded perforation approximately vertical or at right angles thereto, the parts being constructed to be held together by a single screw which passes down through the end of the nose spring and is threaded into the members of the post, substantially as set forth.

2. In eyeglasses, the eye wire divided on its inner side and provided with a post constructed of two members perforated approximately vertically or at right angles to the post, the members forming the juxtaposed ends of the eye wire, the upper member having on its upper surface flanges forming a recess constructed to receive the spring and nose guard one upon the other and the whole held together by a screw passing down through the spring and nose guard and threaded into the members of the post as set forth.

BENAJAH U. BUGBEE.
JOSEPH RENO.

Witnesses:
C. A. PAIGE,
LIZZI GANEY.